United States Patent
Berthezene et al.

(10) Patent No.: US 7,637,614 B2
(45) Date of Patent: Dec. 29, 2009

(54) METHOD FOR THE DETERMINATION OF A PROGRESSIVE OPHTHALMIC LENS

(75) Inventors: Marie-Anne Berthezene, Charenton-le-Poni (FR); Celine Carimalo, Singapore (SG); Diane De Gaudemaris, Charenton-le-Pont (FR); Cyril Guilloux, Paris (FR)

(73) Assignee: Essilor International (Compagnie Generale d'Optique), Paris (FR)

( * ) Notice: Subject to any disclaimer, the term of this patent is extended or adjusted under 35 U.S.C. 154(b) by 320 days.

(21) Appl. No.: 11/724,604

(22) Filed: Mar. 15, 2007

(65) Prior Publication Data
US 2007/0242218 A1 Oct. 18, 2007

(30) Foreign Application Priority Data
Mar. 24, 2006 (FR) ................................... 06 02561

(51) Int. Cl.
*G02C 7/06* (2006.01)
*G02C 7/02* (2006.01)
(52) U.S. Cl. ..................... 351/169; 351/176; 351/177
(58) Field of Classification Search ................. 351/169, 351/176, 177
See application file for complete search history.

(56) References Cited

U.S. PATENT DOCUMENTS

| 4,613,217 | A | 9/1986 | Fuerter et al. |
| 5,270,745 | A | 12/1993 | Pedrono |
| 5,272,495 | A | 12/1993 | Pedrono |
| 5,488,442 | A | 1/1996 | Harsigny et al. |
| 5,784,144 | A | 7/1998 | Kelch et al. |
| 6,318,859 | B1 | 11/2001 | Baudart et al. |
| 6,382,789 | B1 | 5/2002 | Baudart et al. |
| 6,637,880 | B1 | 10/2003 | Yamakaji et al. |
| 6,871,955 | B2 | 3/2005 | Yamakaji et al. |
| 7,427,134 | B2* | 9/2008 | Bourdoncle et al. ......... 351/169 |
| 2006/0209255 | A1* | 9/2006 | Donetti et al. ............... 351/177 |
| 2008/0246914 | A1* | 10/2008 | Carimalo et al. ............ 351/169 |

FOREIGN PATENT DOCUMENTS

| DE | 196 12 284 | 10/1997 |
| EP | 1 154 302 | 11/2001 |

(Continued)

OTHER PUBLICATIONS

Atchison, David A., "Optical models for human myopic eyes", *Vision Research*, vol. 46, pp. 2236-2250 (2006).

(Continued)

*Primary Examiner*—Jordan M. Schwartz
(74) *Attorney, Agent, or Firm*—Hensley, Kim & Holzer, LLC (57) ABSTRACT

A method for the determination of a progressive ophthalmic lens for a given wearer comprises the stages of:
 determining the axial length (LA) of the wearer's eye,
 determining an ergorama associating a sight point with each direction of viewing under wearing conditions,
 determining power and resulting astigmatism defect targets for each direction of viewing under wearing conditions, the targets being a function of the axial length of the wearer's eye,
 calculating the power required on the lens for each direction of viewing by successive iterations in order to obtain the target power defect and the target resulting astigmatism.

8 Claims, 5 Drawing Sheets

FOREIGN PATENT DOCUMENTS

| | | |
|---|---|---|
| FR | 2 753 805 | 3/1998 |
| FR | 2 858 693 | 2/2005 |
| FR | 2 884 130 | 10/2006 |
| GB | 2 277 997 | 11/1994 |

OTHER PUBLICATIONS

Grosvenor, Thoedore et al., "Role of the Axial Length/Corneal Radius Ratio in Determining the Refractive State of the Eye", *Optometry and Vision Science*, vol. 71, No. 9, pp. 573-579.

Navarro, R. et al., "Accommodation-dependent model of the human eye with aspherics", *J. Opt. Soc. Am. A*, vol. 2, No. 8, pp. 1273-1281 (Aug. 1985).

French Search Report dated Nov. 22, 2006.

European Search Report for Application No. EP 07 29 0283 dated Apr. 23, 2007.

\* cited by examiner

METHOD FOR THE DETERMINATION OF A PROGRESSIVE OPHTHALMIC LENS

CROSS REFERENCE TO RELATED APPLICATION

Pursuant to U.S.C. § 119, this application claims the benefit of French Patent Application 06 02 561, filed Mar. 24, 2006. The contents of the prior application is incorporated herein by reference in its entirety.

TECHNICAL FIELD

This invention relates to a method for the determination of a progressive ophthalmic lens; in particular a progressive lens personalized for the specific needs of a given wearer.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and the position of the wearer's eyes relative to the frame.

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327.

Progressive multifocal ophthalmic lenses include a far-vision zone, a near-vision zone, an intermediate-vision zone, a principal progression meridian crossing these three zones. They are generally determined by optimization, based on a certain number of constraints imposed on the different characteristics of the lens. Most marketed lenses are all-purpose lenses, in that they are adapted to the different needs of the wearers at the time.

A progressive multifocal lens can be defined by geometric characteristics on at least one of its aspherical surfaces. In order to characterize an aspherical surface, the parameters constituted by the minimum and maximum curvatures at each point are conventionally used, or more commonly their half-sum and their difference. This half-sum and this difference multiplied by a factor n−1, n being the refractive index of the lens material, are called mean sphere and cylinder.

Moreover, a progressive multifocal lens can also be defined by optical characteristics taking into account the situation of the wearer of the lenses. In fact, the laws of the optics of ray tracings provide that optical defects appear when the rays deviate from the central axis of any lens. Conventionally, the aberrations known as power defects and astigmatism defects are considered. These optical aberrations can be generically called obliquity defects of rays.

Obliquity defects of rays have already been clearly identified in the prior art and improvements have been proposed. For example, the document WO-A-98 12590 describes a method for determination by optimization of a set of progressive multifocal ophthalmic lenses. This document proposes defining the set of lenses by considering the optical characteristics of the lenses and in particular the wearer power and oblique astigmatism, under wearing conditions. The lens is optimized by ray tracing, using an ergorama associating a target object point with each direction of viewing under wearing conditions.

EP-A-0 990 939 also proposes to determine a lens by optimization taking into account the optical characteristics instead of the surface characteristics of the lens. For this purpose the characteristics of an average wearer are considered, in particular as regards the position of the lens in front of the wearer's eye in terms of curving contour, pantoscopic angle and lens-eye distance.

It has been found that each wearer has different lens-eye behaviour. Recently therefore it has been sought to personalize progressive ophthalmic lenses in order to best satisfy the needs of each wearer.

For example, it is proposed, in particular by ZEISS and RODENSTOCK under the references Zeiss Individual® and Impression ILT® respectively, to take account, for the definition of progressive lenses, of the real position of the lens in front of the wearer's eye. For this purpose, measurements of the position of the lens in the frame chosen by the wearer are carried out. The measurement of the position of the lens relative to the wearer's eye is initially difficult to carry out with precision. Then, the optimization is carried out for a measured position of the lens in front of the wearer's eye; it turns out that the position of the frame varies over time and cannot be considered to be constant for a given wearer. Because of these two factors, the consideration of the position of the lens does not seem to provide the wearer an additional comfort compared to solutions which consider only the mean position of the lens.

The applicant markets, under the trade mark VARILUX IPSEO® a range of progressive lenses, which are defined as a function of the wearer's head-eye behaviour. This definition is based on the fact that any wearer, in order to look at different points at a given height in the object space, can move either his head, or his eyes and that the viewing strategy of a wearer is based on a combination of head and eye movements. The wearer's viewing strategy influences the perceived width of the fields on the lens. Thus, the more the wearer's lateral vision strategy involves a movement of the head, the narrower is the zone of the lens scanned by the wearer's vision. If the wearer moved only his head in order to look at different points at a given height of the object space, his vision would still pass through the same point of the lens. The product VARILUX IPSEO® therefore proposes different lenses, for the same ametropia-addition pair, as a function of the wearer's lateral vision strategy.

Moreover, the documents U.S. Pat. No. 6,637,880 and U.S. Pat. No. 6,871,955 describe ophthalmic lenses optimized by taking into account the real position of the centre of rotation of the wearer's eye, referenced CRE. The lens-CRE distance is defined as the sum of the distance lens-cornea (referenced VC) and cornea-CRE (referenced CR). The value VC is a function of the wearing conditions and the value CR is linked to the measurement of the axial length of the eye. The axial length can be measured by the optician or by the optometrist for each individual and the position of the CRE is deduced from this by a rule of three. The axial length of the eye can be measured for example with the device marketed under the trade mark IOLMaster® by ZEISS.

For the optimization of progressive ophthalmic lenses, documents U.S. Pat. No. 6,637,880 and U.S. Pat. No. 6,871, 955 propose taking into account the fact that the CRE is situated at different distances when the wearer is looking in far vision, in near vision or in any other point of the lens and to integrate it in the optimization. For example, it is indicated that a change of the lens-CRE distance has an impact on the lateral shift in near vision; the optical design is therefore calculated as a function of this value. It is also indicated that the lens-CRE distance has an impact on the power required in far vision; the asphericity of the lens is therefore modified as a function of this value.

The applicant has also developed a device for measuring the position of the centre of rotation of the eye of a given individual, which is the subject of the French Patent Application filed by the applicant under the title Method and device for the determination of the centre of rotation of an eye on 8 Apr. 2005 under number FR 05 50902 (now published under number FR-A-2 884 130).

The measurements of the axial length of the eye or of the centre of rotation of the eye are carried out by the optician or the optometrist; they are difficult to carry out and the apparatus is relatively expensive. In addition, these measurements are not used to determine the distributions of power and resulting astigmatism defects on the optimized lens.

Tests carried out in the applicant's laboratories have shown that the axial length of the eye influences the wearer's perception of the fields and gradients. A need still exists therefore for a lens which better satisfies the specific needs of each individual wearer.

SUMMARY

The invention consequently proposes taking into account the wearer's ametropia in order to determine the axial length of the eye and its centre of rotation in order to avoid complex measurements on the wearer. The invention then proposes taking account of this axial length in order to determine the power and resulting astigmatism defect fields and gradients on the optimized lens. The wearer's visual comfort can thus be improved.

The invention more particularly proposes a method for the determination of a progressive ophthalmic lens personalized for a given wearer who has been prescribed a far-vision power ($A_{FV}$) and who has been prescribed a power addition (Add) for near vision, the method comprising the stages of:
- determining the axial length (LA) of the wearer's eye;
- determining an ergorama associating a sight point with each direction of viewing under wearing conditions;
- determining power and resulting astigmatism defect targets for each direction of viewing under wearing conditions, the targets being a function of the axial length of the wearer's eye;
- calculating the power required on the lens for each direction of viewing by successive iterations in order to obtain the target power defect and the target resulting astigmatism.

According to one embodiment, the stage of determining the axial length (LA) of the eye is carried out using the far vision prescription ($A_{FV}$) given to the wearer.

According to one embodiment, the stage of determining the axial length of the eye (LA) is carried out using the far vision prescription ($A_{FV}$) given to the wearer and the measurement of the radius of the wearer's cornea (kerato).

According to an embodiment, a position of the centre of rotation of the eye (CRE) is calculated using the determined axial length of the eye.

According to an embodiment, the stage of determining the targets comprises determining the power and resulting astigmatism defect gradients and determining the power and resulting astigmatism defect field widths.

The invention also relates to a personalized progressive ophthalmic lens obtained by the method of determining the invention, as well as a visual device comprising at least one lens according to the invention and a method for the correction of the vision of a presbyopic subject, which comprises providing the subject with, or the wearing by the subject of, such a device.

DESCRIPTION OF DRAWINGS

Other advantages and features of the invention will become apparent on reading the following description of the embodiments of the invention, given by way of example and with reference to the drawings which show.

DETAILED DESCRIPTION

The invention proposes a method for the determination of a progressive ophthalmic lens for a presbyopic wearer, i.e. for whom a power addition Add has been prescribed for near vision.

In a manner known per se, a progressive lens has a far-vision zone with a control point FV, a near-vision zone with a control point NV and an intermediate-vision zone. A principal progression meridian crosses these three zones. The meridian therefore has a power progression between the control point in far vision FV and the control point in near vision NV; this progression corresponds approximately to the value of the prescribed addition Add. A fitting cross CM is marked by a reference point on the complex surface and constitutes an aid for fitting the cut-out lens into the frame; this fitting cross CM makes it possible to locate on the lens the primary direction of viewing under wearing conditions. In this context, progression length PL refers to the vertical distance between the fitting cross CM and the point of the meridian in near vision NV at which the power progression reaches the power Add. The progression length PL defines the accessibility to the powers necessary in near vision.

Figure 1:
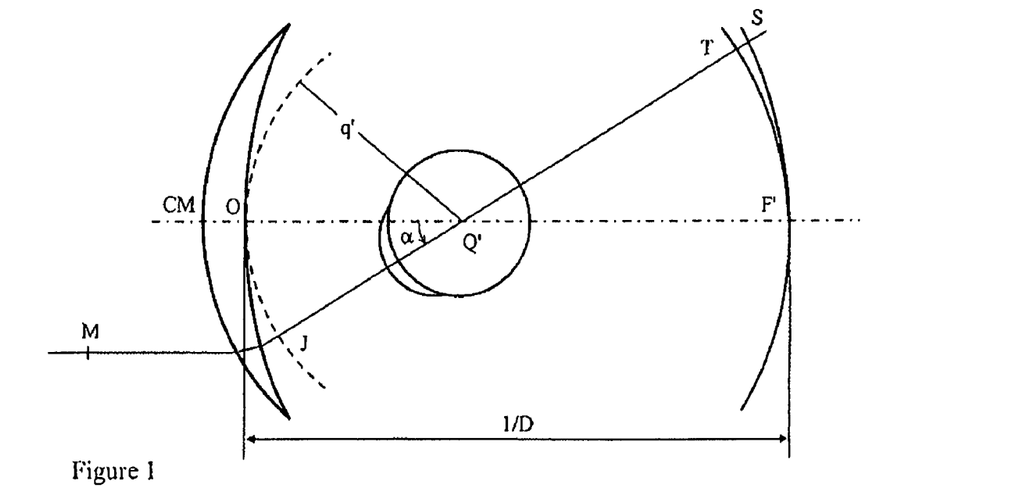
FIG. 1, a diagram of an eye-lens optical system, as a top view.

In a conventional manner, for a given lens, characteristic optical variables are defined, namely a power and a resulting astigmatism, under wearing conditions. FIG. 1 shows a diagram of an eye and lens optical system as a side view, and shows the definitions used in the rest of the description. The centre of rotation of the eye is called Q'; the axis Q'F' represented in the figure by a chain-dotted line is the horizontal axis passing through the centre of rotation of the eye and continuing in front of the wearer—in other words the axis Q'F' corresponds to the primary viewing direction. This axis cuts, on the front face, a point on the lens called the fitting cross CM, which is marked on the lenses in order to allow their positioning by an optician. Let point O be the point of intersection of the rear face and this axis Q'F'. A sphere of the vertices is defined, with a centre Q', and a radius q', which cuts the rear face of the lens at the point O. By way of example, a radius q' value of 27 mm corresponds to a current value and produces satisfactory results when the lenses are worn. The section of the lens can be drawn in the plane (O, x, y) which is defined with reference to FIG. 2. The tangent to this curve at the point O is inclined relative to the axis (O, y) at an angle called the pantoscopic angle. The value of the pantoscopic angle is currently 8°. The section of the lens can also be drawn in the plane (O, x, z). The tangent to this curve at the point O is inclined relative to the axis (O, z) at an angle called the curving contour. The value of the curving contour is currently 0°.

A given direction of viewing—represented by a solid line in FIG. 1—corresponds to a position of the eye in rotation about Q' and to a point J on the sphere of the vertices; a direction of viewing can also be marked, in spherical coordinates, by two angles $\alpha$ and $\beta$. The angle $\alpha$ is the angle formed between the axis Q'F' and the projection of the straight line Q'J over the horizontal plane containing the axis Q'F'; this angle appears in the diagram of FIG. 1. The angle $\beta$ is the angle formed between the axis Q'F' and the projection of the straight line Q'J over the vertical plane containing the axis Q'F'. A given direction of viewing therefore corresponds to a point J of the sphere of the vertices or to a pair ($\alpha$, $\beta$).

In a given direction of viewing, the image of a point M in the object space situated at a given object distance forms between two points S and T corresponding to minimum and maximum distances JS and JT (which are sagittal and tangential focal distances in the case of revolution surfaces, and of a point M at infinity). The angle $\gamma$ marked as the axis of astigmatism is the angle formed by the image corresponding to the smallest distance with the axis ($z_m$), in the plane ($z_m$, $y_m$) defined with reference to FIGS. 2 and 3. The angle $\gamma$ is measured in counterclockwise direction when looking at the wearer. In the example of FIG. 1, on the axis Q'F', the image of a point of the object space at infinity forms at the point F'; the points S and T coincide, which is another way of saying that the lens is locally spherical in the primary direction of viewing. The distance D is the rear front end of the lens.

Figure 2:
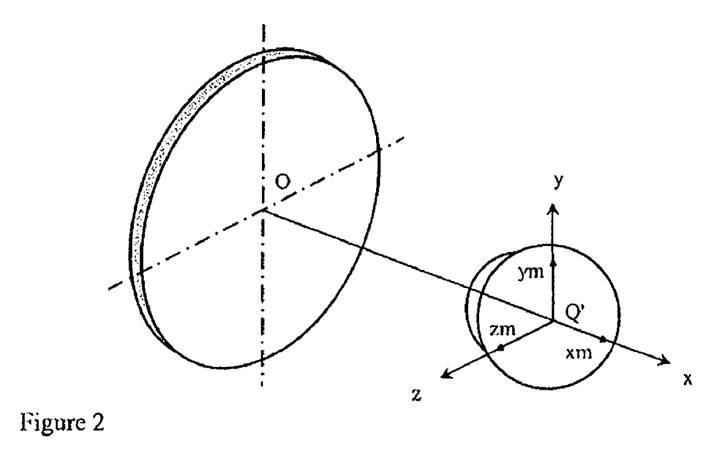
FIGS. 2 and 3, perspective diagrams of an eye-lens system.
Figure 3:
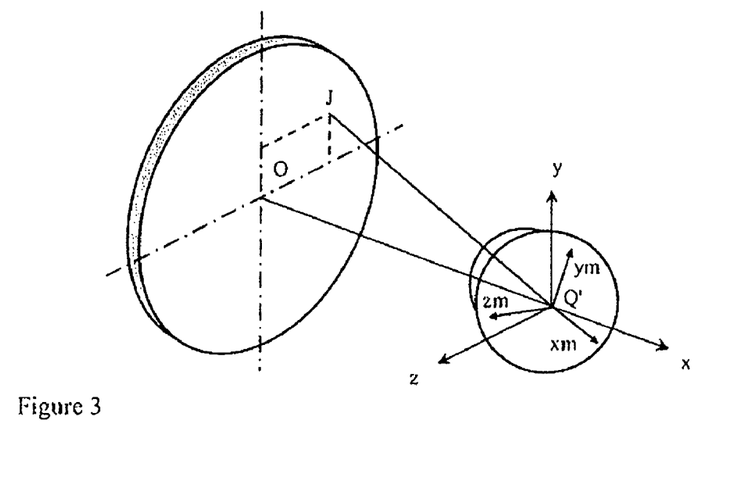

FIGS. 2 and 3 show perspective diagrams of an eye-lens system. FIG. 2 shows the position of the eye and of the reference point linked to the eye, in the principal viewing direction, $\alpha$–$\beta$=0, called the primary viewing direction. The points J and O thus coincide. FIG. 3 shows the position of the eye and of the reference point which is linked to it in one direction ($\alpha$, $\beta$). In FIGS. 2 and 3 a fixed reference {x, y, z} and a reference {$x_m$, $y_m$, $z_m$} linked to the eye are represented, in order to show the rotation of the eye clearly. The origin of the reference {x, y, z} is the point Q'; the axis x is the axis Q'F'—the point F' is not represented in FIGS. 2 and 3 and passes through the point O; this axis is orientated from the lens towards the eye, in agreement with the direction of measurement of the axis of astigmatism. The plane {y, z} is the vertical plane; the y axis is vertical and orientated upwards; the z axis is horizontal, the reference being directly orthonormalized. The reference {$x_m$ $y_m$, $z_m$} linked to the eye has the point Q' as its centre; the axis $x_m$ is given by the direction JQ' of viewing, and coincides with the reference {x, y, z} for the primary direction of viewing. Listing's law gives the relationships between the references {x, y, z} and {$x_m$, $y_m$, $z_m$}, for each direction of viewing, see Legrand, *Optique Physiologique*, Volume 1, Edition de la Revue d'Optique, Paris 1965.

Using these data, optical power and astigmatism of the wearer can be defined in each direction of viewing. For a direction of viewing ($\alpha$, $\beta$), an object point M at an object distance given by the ergorama is considered. The points S and T between which the image of the object forms are determined. The image proximity PI is then given by $$PI = \frac{1}{2}\left(\frac{1}{JT} + \frac{1}{JS}\right)$$

while the object proximity PO is given by $$PO = \frac{1}{MJ}$$

The power is defined as the sum of the object and image proximities, i.e.

$$P = PO + PI = \frac{1}{MJ} + \frac{1}{2}\left(\frac{1}{JT} + \frac{1}{JS}\right)$$

The amplitude of the astigmatism is given by $$A = \left|\frac{1}{JT} - \frac{1}{JS}\right|$$

The angle of the astigmatism is the angle $\gamma$ defined above: it is the angle measured in a reference linked to the eye, relative to the direction $z_m$, with which the image T forms, in the plane ($z_m$, $y_m$). These definitions of power and of astigmatism are optical definitions, under wearing conditions and in a reference linked to the eye. Qualitatively, the thus-defined power and astigmatism correspond to the characteristics of a thin lens, which, fitted instead of the lens in the direction of viewing, provides the same images locally. It is noted that, in the primary direction of viewing, the definition provides the standard value of the astigmatism prescription. Such a prescription is produced by the opthalmologist, in far vision, in the form of a pair formed by an axis value (in degrees) and an amplitude value (in diopters).

The thus-defined power and astigmatism can be experimentally measured on the lens using a frontofocometer; they can also be calculated by ray tracing under wearing conditions.

The present invention proposes to take into account the geometry of the wearer's eye in order to optimize a progressive ophthalmic lens specifically suited to the wearer's needs. The taking into account of such individual parameters is now possible on an industrial scale thanks to the methods for direct machining of the complex surfaces constituting the progressive lenses.

Figure 4:
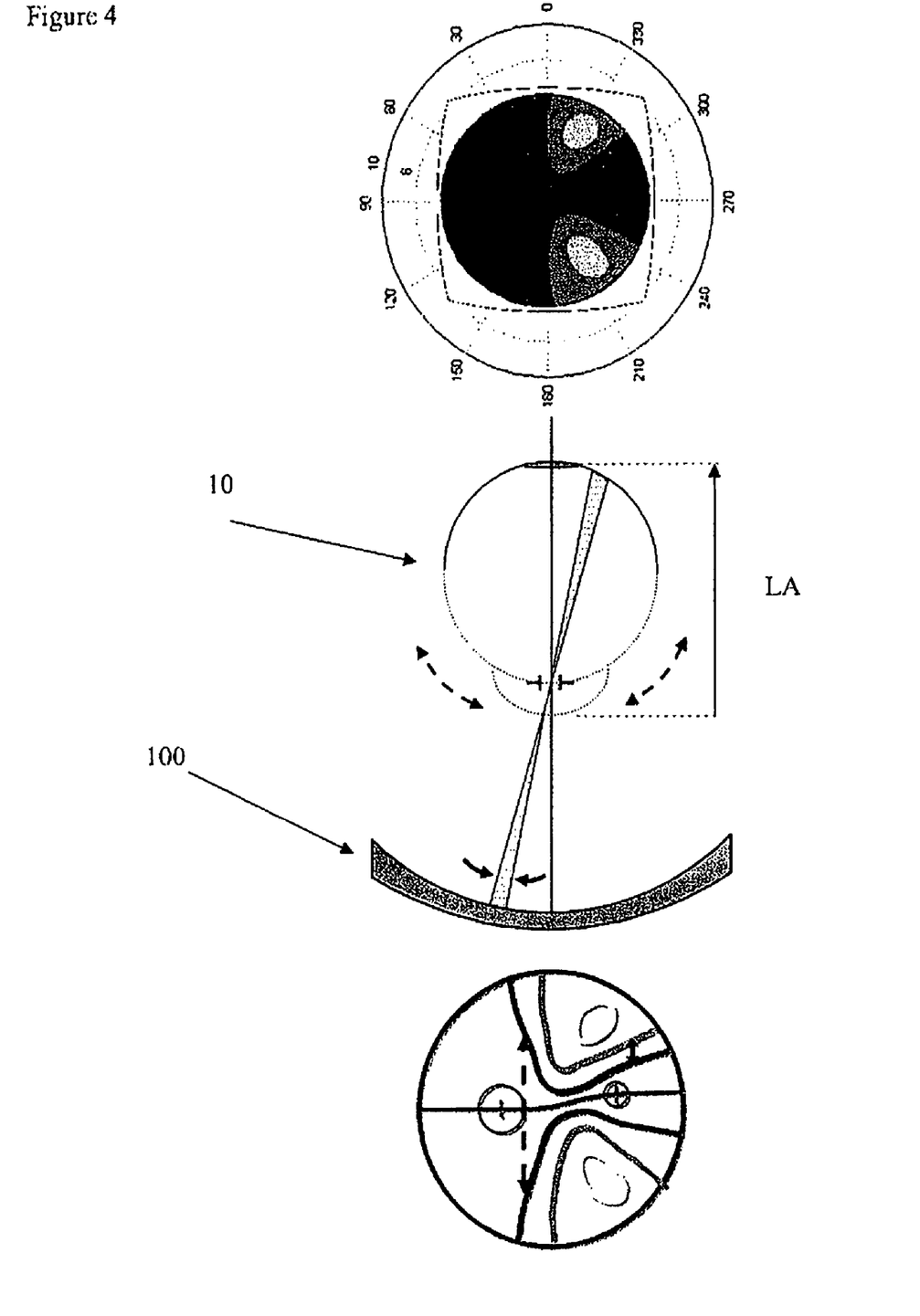
FIG. 4, a diagram illustrating the transfer function between a progressive ophthalmic lens and the retina.

FIG. 4 illustrates the relationship which exists between the design of the lens and its projection on the retina in the lens—eye system. Numerous eye models have been developed in order to define lens-eye systems and to allow the optical optimization of progressive ophthalmic lenses. Reference can be made for example to the model defined in the publication <<Accommodation dependent model of the human eye with aspherics>> by R. Navarro, J. Santamaria and J. Bescos, Optical Society of America, Vol. 2, No 8, August 1985. In the context of the invention, attention will be paid more particularly to the position and the shape of the retina as well as the position of the centre of rotation of the eye, referenced CRE.

FIG. 4 shows an eye 10 having an axial length LA. The eye is represented with a cornea, a pupil and a retina. A lens 100 is placed in front of the eye 10. The axial length of the eye LA is the cornea—retina distance. This axial length is specific to each individual and it has been found that it is closely correlated to the wearer's ametropia, as explained below. At the bottom of FIG. 4 there is a diagrammatic representation of the resulting astigmatism defect of the lens and at the top a representation of the perception of this resulting astigmatism on the retina for the different directions of viewing behind the lens. Thus, using desirable optico-retinal quantities in terms of field widths and gradients, power and resulting astigmatism defect targets can be defined in order to optimize the progressive lens under wearing conditions.

Figure 5A:
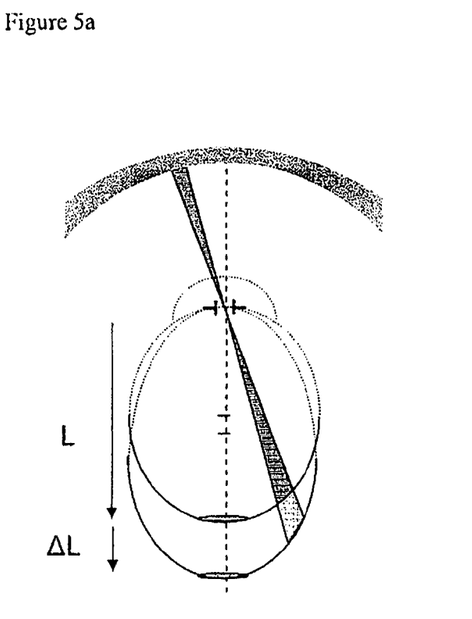
FIGS. 5a and 5b, diagrams illustrating respectively the gradients projected on the retina and the field widths perceived by the wearer as a function of the axial length of the eye.
Figure 5B:
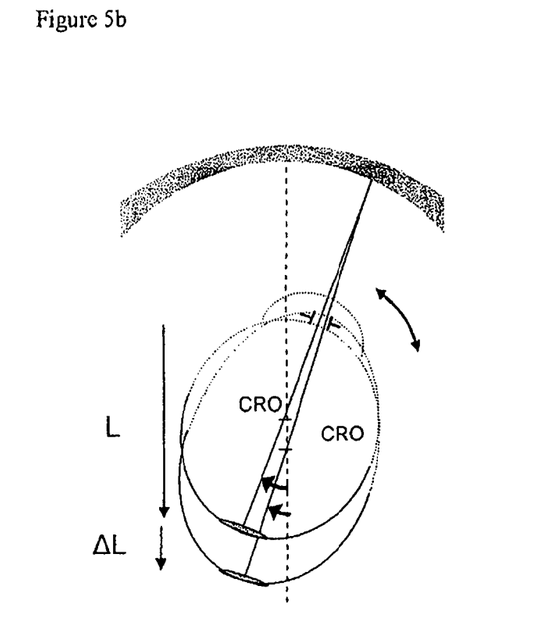

The transfer function between the optimized lens under wearing conditions and the retina depends on the biometric parameters of the eye and in particular the axial length of the eye. In fact, as illustrated in FIGS. 5a and 5b, the length of the eye has an impact on the gradients projected on the retina and on the width of the fields perceived. As illustrated in FIG. 5a, when the eye is longer than an average emmetrope eye, i.e. has an axial length equal to L+ΔL (ΔL>0), the retina is situated further away and has a more elongated shape than for an eye having an average axial length: in other words, the projection of a set of object points perceived through the lens is more spread out on the retina that for an eye having an average axial length L. The average axial length L of an emmetrope eye is generally 24 mm. For a long eye, the sensation of gradient on the retina is therefore gentler. The power and resulting astigmatism defect gradients on the lens can therefore be stronger without disturbing a wearer having a long eye. Similarly, as illustrated in FIG. 5b, when the eye is long, the position of the centre of rotation CRE is distanced proportionally from the pupil relative to an average emmetrope eye. The angle of rotation of the eye for perceiving an object through the same point of the lens is therefore reduced. Thus, the longer the eye the greater the sensation of reduced field. The power and resulting astigmatism fields on the lens must therefore be enlarged in order to provide a wearer having a long eye with good visual comfort. Inversely, in the case of a short eye, the sensation of gradients on the retina is less gentle and the sensation of field on the retina is stronger than in the case of an eye having an average axial length L. In fact, the retina is situated in front and has a flatter shape than in the case of an average eye. The gentler gradients will thus be preferred in order to provide a wearer having a short eye with good visual comfort.

Figure 6:
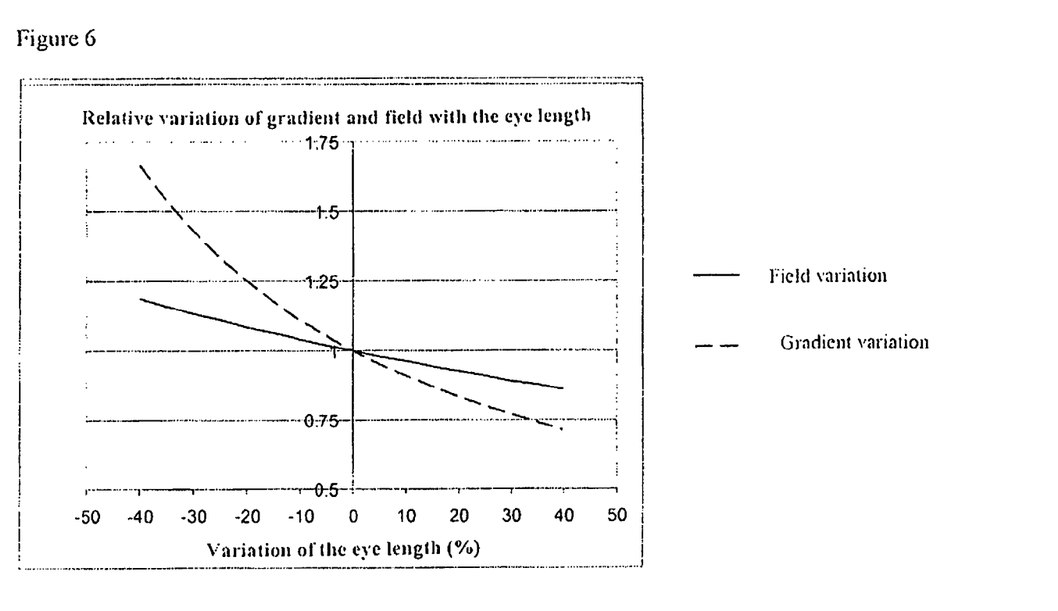
FIG. 6, a graph of the relative variation of gradient and field with the axial length of the eye.

FIG. 6 is a graph showing the relative gradient and field variation with the axial length of the eye. The dotted-line curve represents the relative variation of perceived gradient, i.e. the ratio G'/G with G' the gradient perceived on the wearer's retina and G the gradient for an average eye length L. The thick-line curve represents the relative variation of perceived field, i.e. the ratio C'/C with C' the field perceived on then wearer's retina and C the field for the average eye length L. This graph clearly shows that the length of the eye has an impact in terms of field and gradients projected on the retina. The longer the eye (positive variation), the weaker the gradients perceived and the more reduced the fields perceived, and the shorter the eye (negative variation), the stronger the gradients perceived and the broader the fields perceived.

In order to compensate for these morphologic effects, the method for the determination of a progressive ophthalmic lens according to the invention proposes to take into account the biometric parameters of the eye and in particular the axial length of the eye in order to define a field/gradient compromise when determining the optical optimization targets of the lens in order to provide the wearer with optimal visual comfort.

Figure 7:
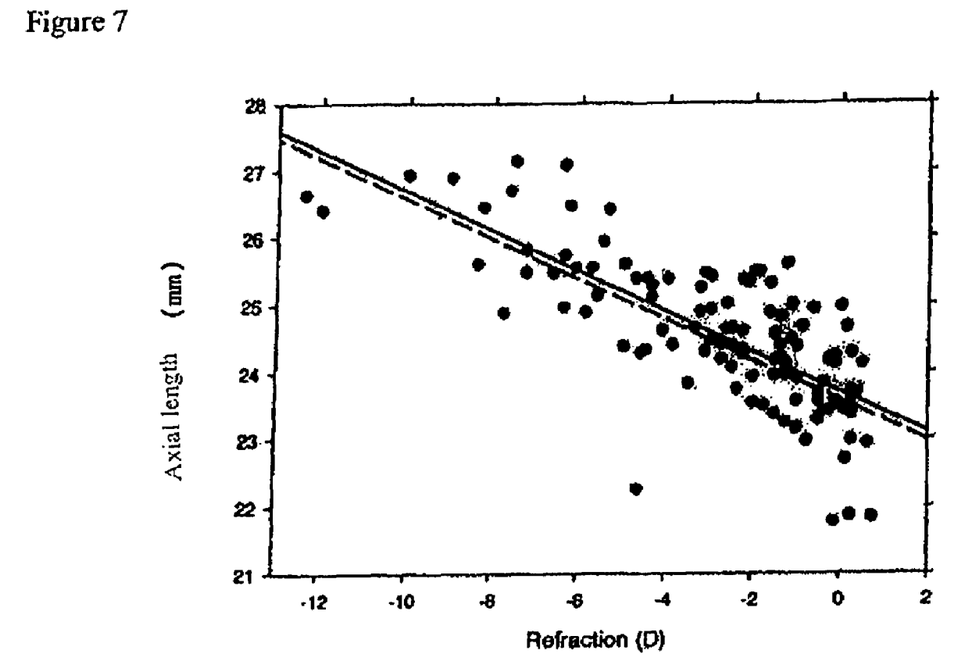
FIG. 7, a graph showing axial length measurements correlated to the ametropia of the wearers.

As explained previously, the axial length of the eye can be measured by the optician or the optometrist, but this measurement is complex and is not always carried out. It has in fact been established that a significant correlation exists between the wearer's ametropia $A_{FV}$, i.e. the far vision prescription given to the wearer, and the length of the eye. The article by David A. Atchison <<Optical Models for human myopic eyes>>, Vision Research 46 (2006) 2236-2250 discussed this correlation and showed that the more myopic the wearer, the longer the eye. The graph of FIG. 7 illustrates this correlation between the length of the eye expressed in mm and the refraction expressed in diopters or power prescribed for the wearer in far vision $A_{FV}$. A linear function was able to be constructed from measurements carried out on 121 wearers; this function can be expressed as follows:

$$LA = -0.299 A_{FV} + 23.58 \qquad (1)$$

It is therefore possible to manage the field/gradient compromise in order to take account of the biometric parameters of the eye directly through the wearer's ametropia $A_{FV}$.

Figure 8:
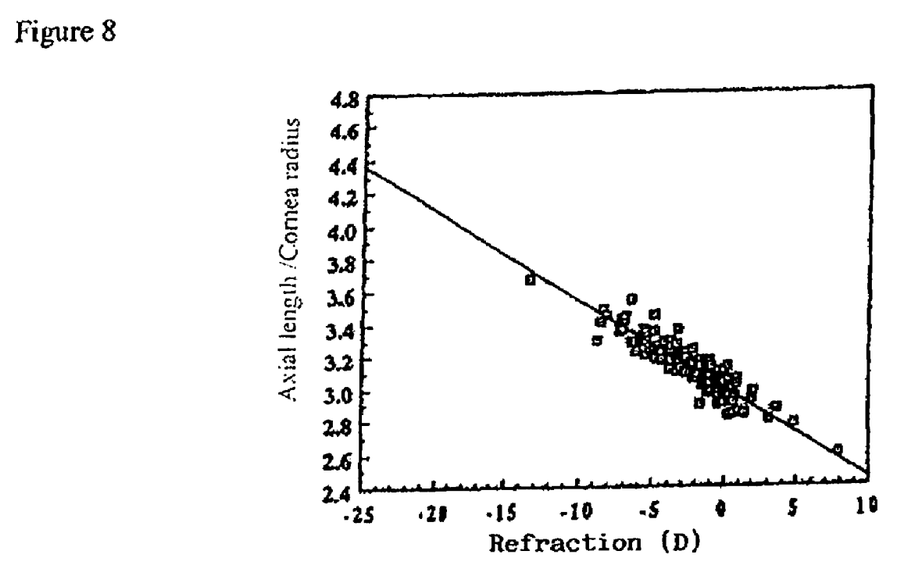
FIG. 8, a graph showing measurements of the ratio of the axial length of the eye over the keratometry correlated to the ametropia of the wearers.

It has also been established that an even greater correlation exists between the wearer's ametropia $A_{FV}$ and the ratio of the eye length over the keratometry—or the radius of the cornea of the eye. The article by T. Grosvenor & R. Scott, <<Role of the Axial Length/Corneal Radius Ratio in Determining the Refractive State of the Eye>>, Optometry and Vision Science Vol. 71, No. 9, pp. 573-579 discussed this correlation and showed that the ratio of the eye length over keratometry (LA/kerato) does indeed depend on the wearer's ametropia $A_{FV}$. The graph of FIG. 8 illustrates this correlation LA/kerato with the power prescribed for the wearer in far vision $A_{FV}$ and a linear function was able to be constructed from measurements carried out on 194 wearers. This function can be expressed as follows:

$$LA/\text{kerato} = -0.05446 A_{FV} + 2.9988 \qquad (2)$$

It should be noted that the dispersion of the measurements around function (2) is less than that of the measurements around function (1). Knowledge of the wearer's ametropia and cornea radius makes it possible, using the function of the graph of FIG. 8, to deduce the axial length of the eye in a relatively reliable manner. The cornea radius can be measured using a standard device such as a manual keratometer or an autorefractor. This device is less expensive and easier to use than that used to measure the centre of rotation of the eye or the axial length of the eye. Measurement of the cornea radius can therefore be carried out by the optician or the optometrist, at less cost and in a reliable manner. These measurements of the keratometry and of the wearer's ametropia value are then used in order to determine the axial length of the wearer's eye with function (2) above.

The method of the invention then proposes to set power and resulting astigmatism targets which depend on the axial length of the eye in order to determine the lens by optical optimization. In particular, the power and resulting astigmatism target values determine gradients and field widths which take account of the axial length of the eye. Moreover, using one of the functions (1) and (2) defined previously, the power and astigmatism targets could be determined using the prescription given in far vision $A_{FV}$, and the addition Add prescribed for the wearer. The determination of the axial length of the wearer's eye makes it possible to calculate the position of the centre of rotation of the eye (CRE) without requiring the use of complex measurements. Using the targets set taking account of the axial length of the eye, the lens can be optimized under wearing conditions with a modelling of the gradients projected on the retina and the fields perceived taking account of the real position of the centre of rotation of the wearer's eye.

Figure 9:
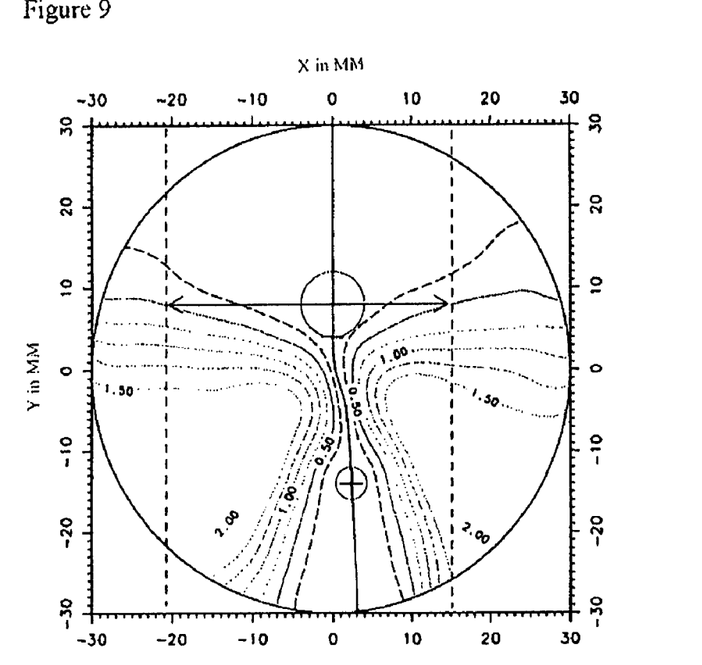
FIG. 9, a cylinder map of a lens according to the invention intended for a hypermetropic wearer.
Figure 10:
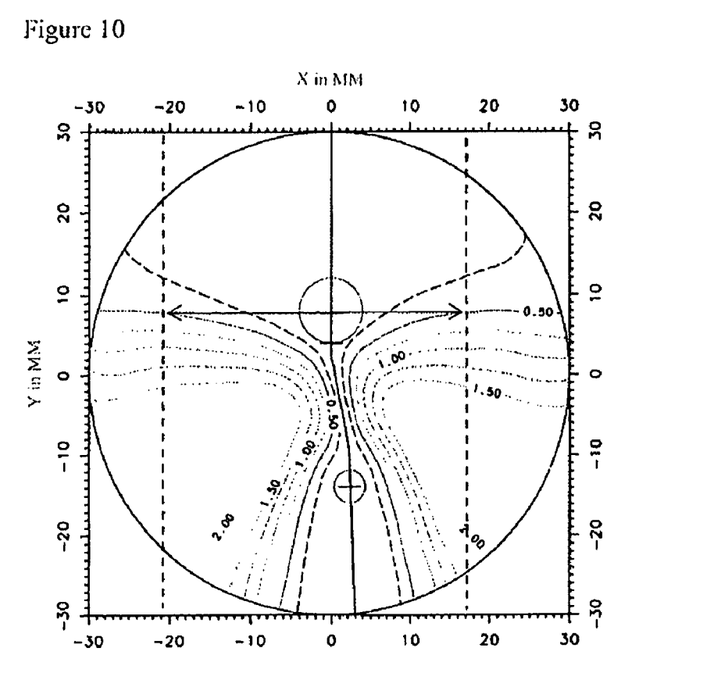
FIG. 10, a cylinder map of a lens according to the invention intended for a myopic wearer.

FIGS. 9 and 10 show cylinder maps for lenses determined using the method according to the invention respectively for a hypermetropic wearer and for a myopic wearer.

The lens of FIG. 9 has been optimized for a hypermetropic wearer having a power prescription $A_{FV}$ equal to 2 diopters and a near vision power addition Add equal to 2.0 diopters; and the lens of FIG. 10 has been optimized for a myopic wearer having a power prescription $A_{FV}$ equal to −5.75 diopters and a near vision power addition Add equal to 2.0 diopters. By applying formula (1) there is deduced therefrom an axial length of the hypermetropic wearer's eye equal to 23 mm and an axial length of the myopic wearer's eye equal to 25.3 mm.

The axial length of the myopic wearer's eye is therefore approximately 10% greater that the axial length of the hypermetropic wearer's eye. If we look at the graph of FIG. 6, for an elongation of the axial length of the eye of 10%, the field width must be increased by 5% and the gradient by 10% for the lens intended for the myopic wearer compared to the lens intended for the hypermetropic wearer.

On the cylinder maps of FIGS. 9 and 10 this proportional increase of the field width is obtained by measuring the width between the 0.5 diopter isocylinder lines on a horizontal line passing through the far vision control point. A field width of 36 mm is thus measured for the hypermetropic lens (FIG. 9) and a field width of 38 mm for the myopic lens (FIG. 10).

Similarly, on the cylinder maps of FIGS. 9 and 10 this proportional increase in the gradient is found by measuring the maximal cylinder gradient level on a horizontal line passing through the far vision control point. A maximal gradient of 0.09 D/mm is thus measured for the hypermetropic lens (FIG. 9) and a maximal gradient of 0.10 D/mm for the myopic lens (FIG. 10).

Thus, each wearer, as a function of his ametropia, can wear a lens which best corresponds to his perception of the image points on his retina for the different directions of viewing behind the lens.

What is claimed is:

1. Method for the determination of a progressive ophthalmic lens personalized for a given wearer who has received a far vision prescription and for whom a power addition has been prescribed for near vision, the method comprising the stages of:
   determining the axial length of the wearer's eye;
   determining an ergorama associating a sight point with each direction of viewing under wearing conditions;
   determining power and resulting astigmatism defect targets for each direction of viewing under wearing conditions, the targets being a function of the axial length of the wearer's eye;
   calculating the power required on the lens for each direction of viewing by successive iterations in order to obtain the target power defect and the target resulting astigmatism.

2. The method of claim 1, in which the stage of determining the axial length of the eye is carried out using the wearer's far vision prescription.

3. The method of claim 1, in which the stage of determining the axial length (LA) of the eye is carried out using the wearer's far vision prescription and the measurement of the radius of the wearer's cornea.

4. The method of one of claims 1 to 3, in which a position of the centre of rotation of the eye is calculated using the determined axial length of the eye.

5. The method of one of claims 1 to 3, in which the stage of determining the targets comprises determining the power and resulting astigmatism defect gradients and determining the power and resulting astigmatism defect field widths.

6. A progressive ophthalmic lens personalized for the needs of a wearer determined by the method of claim 1.

7. A visual device comprising at least one lens according to claim 6.

8. A method for correcting the vision of a presbyopic subject, which comprises providing the subject with, or the wearing by the subject of, a device according to claim 7.

* * * * *